W. L. WATSON.
AUTOMATIC CONTROL LEVER SHIFTING MECHANISM.
APPLICATION FILED APR. 5, 1915.

1,371,655.

Patented Mar. 15, 1921.

WITNESSES

INVENTOR
WILLIAM L. WATSON
BY
ATTORNEYS

UNITED STATES PATENT OFFICE.

WILLIAM L. WATSON, OF McKENZIE, NORTH DAKOTA.

AUTOMATIC CONTROL-LEVER-SHIFTING MECHANISM.

1,371,655.     Specification of Letters Patent.      Patented Mar. 15, 1921.

Application filed April 5, 1915. Serial No. 19,165.

*To all whom it may concern:*

Be it known that I, WILLIAM L. WATSON, citizen of the United States, resident of McKenzie, county of Burleigh, State of North Dakota, have invented certain new and useful Improvements in Automatic Control-Lever-Shifting Mechanism, of which the following is a specification.

The object of my invention is to provide a device by means of which the control lever of a car can be thrown forward and the brakes released by the movement of the foot of the driver, thereby allowing the driver the use of both hands on the steering wheel and dispensing with the necessity of stooping to reach and operate this lever.

The invention consists generally in various constructions and combinations, all as hereinafter described and particularly pointed out in the claim.

Figure 1:
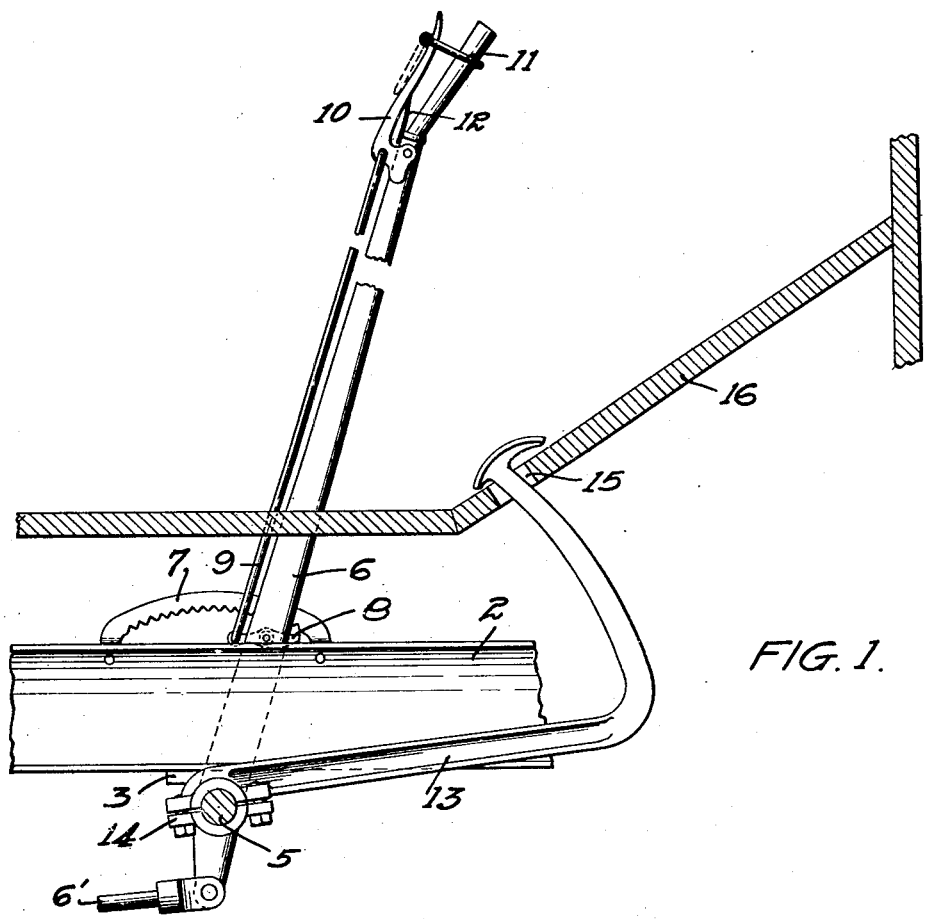
Figure 2:
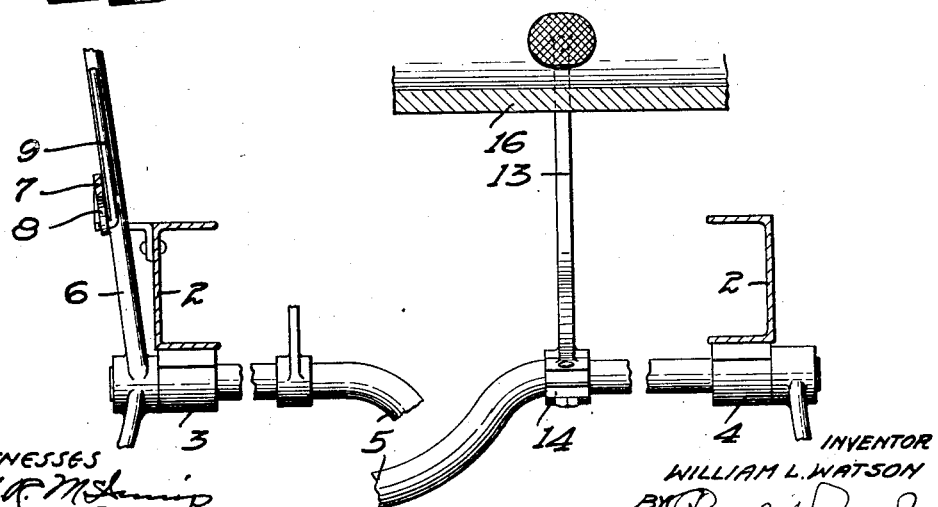

In the accompanying drawings forming part of this specification,

Figure 1 is a detail view, partially in section, illustrating the application of the device to the control lever and foot board of a car, Fig. 2 is a transverse sectional view through the forward portion of the car, showing the control lever and shaft, the middle portion of the shaft being broken away, In the drawing, 2 represents the side rails of the car composed, preferably, of channel bar on account of its strength and rigidity and having bearings, 3 and 4 for a controller shaft 5 which extends transversely of the machine. A lever 6 is mounted on one end of said shaft and connected by suitable means, such as rods 6', with the car brake, (not shown) and movable past the teeth of a bar 7 and provided with a dog 8 connected by a rod 9 with a latch 10 that is pivoted on said latch near the hand grip thereof. A link 11 is mounted on said lever to engage said hand grip and lock the dog in its inactive position. Normally, the dog will be held in engagement with the teeth of the rack 7 by the tension of a spring 12. When this lever is thrown backward, the car will be thrown out of high gear and the car brakes will be set and the lever will be locked by the engagement of the dog with the teeth of the rack. Normally, to release the brakes the latch 10 is operated to disengage the dog from the teeth and the lever may then be thrown forward to its neutral and high speed position.

The dog 8 will be used only when it is desired to set the brakes and at such a time the hook 11 will be disengaged from the lever 6 to allow the dog to engage with the teeth of the rack bar 7, thereby locking the lever in position to set the brakes. When this lever is used merely for the gear shifting operation, the hook 11 will engage the hand grip and lock the dog out of contact with the rack bar teeth.

To avoid the necessity of throwing the lever forward and backward by hand, I provide an L-shaped foot lever 13 secured on the shaft by a clamp 14 and having its free end projecting up through a slot 15 in the foot board 16. This foot lever will be thrown upward by the backward movement of the lever 6 and the rocking of the shaft 5, so that when the dog 8 is disengaged from the teeth of the rack and held by means of the link 11, the driver of the car, placing his foot on the lever 13, can instantly throw the lever 6 to its forward high speed position without removing the hands from the steering wheel.

The details of construction herein shown and described may be modified and still be within the scope of my invention.

I claim as my invention:

The combination, with a motor vehicle frame, of a control lever shaft journaled therein, a control lever mounted on said shaft and having a ratchet dog and latch therefor, a rack having teeth in the path of said dog, a foot lever secured to said shaft and projecting forwardly therefrom and having an upwardly turned extension at its forward end, a foot board adjacent said lever having a slot through which the upwardly turned extension of said foot lever projects, said foot lever being tilted upward by the backward movement of said control lever to its low-gear position and pressure of the foot on said foot lever rocking said shaft and throwing said control lever from its backward or low speed position to its forward or high speed position.

In witness whereof, I have hereunto set my hand this 1st day of April, 1915.

WILLIAM L. WATSON.

Witnesses:
    GENEVIEVE E. SORENSEN,
    EDWARD A. PAUL.